United States Patent Office 3,329,157
Patented July 4, 1967

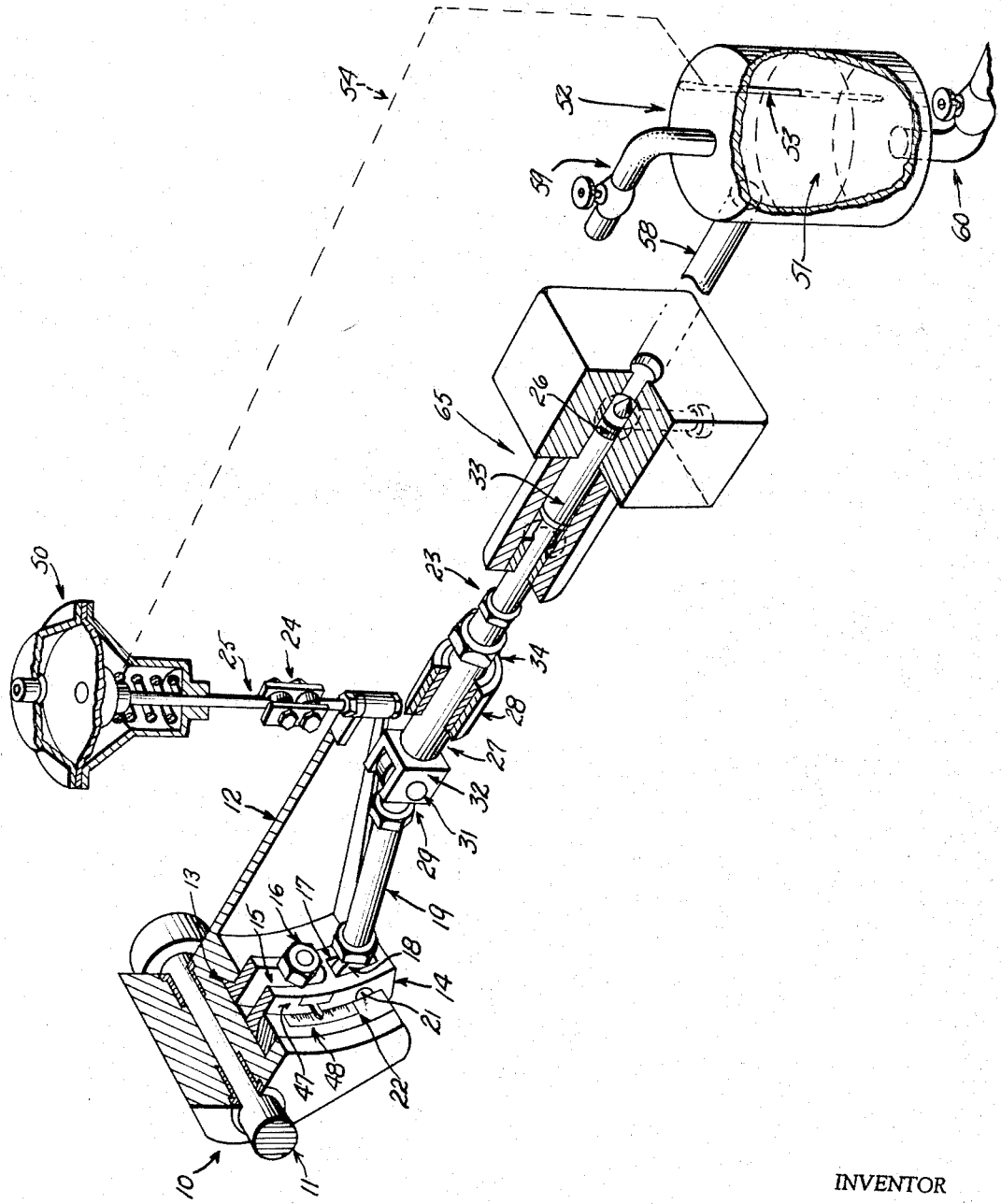

3,329,157
HIGH PRESSURE LET-DOWN VALVE
Herman A. Remmert, Memphis, Tenn., assignor to W. R. Grace & Co., New York, N.Y., a corporation of Connecticut
Filed Oct. 23, 1965, Ser. No. 503,676
1 Claim. (Cl. 137—393)

This is a continuation-in-part of my copending application Ser. No. 293,002, filed July 5, 1963, now abandoned.

This invention relates to a mechanism for activating a valve. More particularly, it relates to a mechanism for activating the valve adapted to let-down very high pressures to pressures of a much lower order.

The specific mechanism which is herein described is designed for use in the let-down stage following ammonia synthesis where the required pressure drop is from about 8,000–12,000 p.s.i.g. to pressures in the order of about 1,000 p.s.i.g. and where the flow of anhydrous liquid ammonia is approximately from 10 to 60 gallons per minute. It will, however, become apparent that the device possesses general utility and may be used wherever high pressures accompanied by relatively small flows must be controlled with a high degree of accuracy.

Commercial high pressure processes for the synthesis of anhydrous ammonia produce streams of liquid anhydrous ammonia at pressures of about 8,000–12,000 p.s.i.g. At such pressures, the ammonia streams contain substantial quantities of dissolved gases. These must be removed. Removal usually is accomplished by dropping the pressure, whereupon ebullition of the unwanted gases takes place. The amount of gas removed in this step is proportional to the drop in pressure. Consequently, for effective gaseous impurity removal, a very large pressure drop is desired.

It is common to drop the pressure some twelvefold in the first let-down, i.e., from some 12,000 to about 1,000 p.s.i.g. A further let-down is usually practiced, for, commercially, liquid anhydrous ammonia is neither stored nor transported at pressures much in excess of the saturation pressure at normal ambient temperature—about 200 p.s.i.g.

Many attempts have previously been made to control the pressure reduction and the liquid flow automatically, but the automatic control of the primary let-down involving, as it does, quite small flows but extreme pressure drops has been so unsatisfactory that manual adjustment of a heavy-duty type let-down needle valve or plug valve is still the resort of the industry. This demands the constant attention of a watch-operator.

No matter how attentive the operator may be, large fluctuations occur. Not only must the operator notice the change, but his response time plus the relatively slow response of the valve itself cause over and under shoots as shown by the spiked patterns drawn by the level recorders on the surge vessel immediately downstream of the aforesaid let-down valve. There is a maintenance problem as well, for the normal wear on both seat and plug under continuous operating conditions with manual control reduces the service life of a primary let-down valve to a few weeks.

In the extreme pressure ranges at which these valves are used, valves having a flat, annular seat and in which the valve element is a disc which closes against the seat, give a somewhat longer service life. However, the high thrust necessary to move the valve against the head pressure and the great change in liquid flow which occurs following very small stem movements makes let-down control with such valves an impractical plant practice.

I have found that by introducing a positive, variable, linear, stroke-reducing mechanism that the high thrusts which are necessary to move the valve stem against the head pressure as well as the controlled micro-positioning of the valve which results, produces a combination capable of such precise control that said stroke-reducing mechanism may be directly connected to the motor element associated with a level-sensing instrument. Although simple, flat, annular-seat valves can be used in combination with my control device, I prefer to use a valve in which the valve disc closes against a sharp V ridge rising from the annular seat and in which a nipple of parabolic section projects from the face of the valve disc. The base diameter of the nipple nearly equals the diameter of the orifice in the annular seat and, as the valve opens, flow past the parabolic surface products a very even radial flow of liquid across the seat. Such valves are known per se and are not part of this invention, but I prefer to use them in combination with the instant invention because the accuracy of the control is thereby bettered and because the service life of such valves where used in combination with the device of my invention is considerably longer than that of most other types of valves used in such combination.

The delicacy and precision of control which this combinaton makes possible are far better than the best efforts with manual control. Instead of the usual spiked or star-like pattern, obtained with manual control, the liquid ammonia level record of the operation of this valve, where used in combination with the aforesaid stroke-reducing mechanism, drawn by a recorder on a 24-hour circular chart is nearly a perfect circle.

Accordingly, the objects of the invention are to produce a valve control mechanism capable of being operated by the motor elements of process control instruments; to produce a mechanism having extremely quick response; and to provide apparatus which will, in response to signals of the sensing means, secure the consistent positioning of the valving element in such micro-increments of motion as may be necessary for the proper flow control of fluids at high pressures.

The invention will be best understood by reference to the drawing in which:

FIG. 1 is an overall perspective view of the valve and stroke linkage assembly showing the surge vessel downstream of the valve. Portions of the valve, packing gland, anti-friction bearing, and surge vessel are shown in cutaway. For visual emphasis, no supporting structure has been shown.

The micro-movements of the valve shown generally at 65 are secured by the motion of bell-crank 10, which is rotated on shaft 11, by the crank or power arm 12. Shaft 11 is supported on rigid supporting structure no portion of which is shown in FIG. 1. A long radius (11 inches in the prototype) is cut in the face of bell-crank 10, one wall of which is dove-tailed to form a way 13. The radiused slide-bar 14, shaped to fit and slide along way 13, is slotted at 15 to receive the retainer stud 16, while slot 17, at the lower end of the slide-bar 14, receives a uni-ball rod end bearing 18, of link 19. Pin 21, passing through the ball, connects the link 19, and slide-bar 14. Locking bar 22, holds the set position of slide-bar 14, on the bell-crank 10. The crank-arm 12, which is rigidly attached to the bell-crank 10, terminates in a shackle 24, which connects to the thrust rod 25, of a commercial pressure-responsive diaphragm motor shown partially cut-away at 50. Motor 50 is activated by changes of the liquid ammonia level 51, in the surge vessel shown generally at 52; said surge vessel being immediately downstream of valve 65 and communicating with said valve via line 58; changes in said level are detected by conventional level detector 53, and transmitted to motor 50, via conventional connecting means 54. Movement of rod 25, accordingly tilts the bell-crank 10. The motion of rod 25, much reduced in amplitude, is transmitted to the valve plug 26, through the link 19, to shaft 27. Shaft 27, is supported by a linear, anti-friction bearing 28. The connection between the link 19, and shaft 27, is made by a uni-ball rod end-bearing 29, which is pinned at 31 to the yoke 32, of shaft 27. Valve shaft 33, is joined to shaft 27, by a threaded connection 23, and adjustable coupler 34.

In the design shown, the ratio of movement of rod 25, to that of the valve plug 26, may be adjusted between 4:1 to 32.5:1 by moving the slide-bar 14, up or down along the way 13, of the bell-crank 10, after loosening stud 16, which is tightened subsequent to such adjustment. A pointer 47, and a graduated scale 48, aid in adjustment.

It is an important element of this invention that the slide bar 14, defines the radius of a circle the center of which is the ball joint 29. This permits ready adjustment of motion ratio with both the incoming motion means, i.e., the thrust rod 25, and the outgoing motion means, i.e., the valve shaft 33, at rest.

The valve and operator was designed for and tested under the following service conditions.

Operator—Mason-Neilan, Case #13
    Direct diaphragm motor
    Stroke—1½ inches
    Effective diaphragm area—105 in. sq.
    Operating pressure range—6 to 30 p.s.i.g.
Valve
    Inlet pressure—12,000 p.s.i.g.
    Outlet pressure—1,000 p.s.i.g.
    Stem thrust—4,000 lbs. max./3,000 lbs. min. (depending on stem packing tightness)
    Stroke o/c—⅜ inch
    Flow range—10 to 30 gallons per minute
Controller
    Thrust capacity—8,000 lbs.
    Stroke—0.375 max./0.046 min.
    Ratio range—4:1 to 32.5:1

The test for uniformity of operation was as follows: The slide-bar 14, was set to give a linear reduction in stroke of 8 to 1. The diaphragm motor was carried through its full stroke. The excursion of shaft 33, was measured each time the thrust rod 25, moved 0.004 inch. In every instance throughout the total movement of rod 25, the incremental movement of shaft 33, was measured as 0.0005 inch.

This capacity for producing extremely small, accurately controlled movement under extreme pressure conditions produces an accuracy of pressure let-down which heretofore has been unobtainable. Completely automatic let-down control results.

I claim:

A high pressure let-down valve system comprising in combination a high pressure reciprocating valve, said valve having a valve shaft, said valve being operated by a reciprocating motor, said motor having a thrust rod communicating with the aforesaid valve shaft through a stroke-reducing mechanism comprising in combination a shackle communicating with said thrust rod and communicating with a crank arm, said crank arm being rigidly and integrally attached to a bell-crank, said bell-crank communicating with and rotating on a first shaft, said bell-crank communicating with a radiused slide-bar, said slide-bar fitting into a way, said way being cut in a face of said bell-crank, said slide-bar having a first slot in a first end and a second slot in a second end, said slide-bar having a retaining stud in said first slot, and said slide-bar communicating with and receiving a first uni-ball rod end bearing in said second slot, said slide-bar and said first uni-ball end bearing being held in communication by a first pin, said first pin passing through said slide-bar and said first uni-ball end bearing, said first uni-ball end bearing being rigidly attached to and communicating with a first end of a link, said link communicating via a second end with a second uni-ball rod end bearing, said second uni-ball end bearing being rigidly attached to said second end of said link, and said uni-ball end bearing communicating with a yoke and being held in communication therewith with a second pin, said second pin communicating with said second uni-ball end bearing and with said yoke, said yoke being rigidly and integrally attached to a first end of a second shaft, said second shaft being supported by a linear anti-friction bearing and having a second end, said second end communicating with a first end of said valve shaft via a threaded connection and an adjustable coupler, said valve shaft having a second end comprising a projecting nipple positioned to permit an even radial flow of liquid across an annular valve seat, said valve communicating via a line with a surge vessel immediately downstream of said valve, said surge vessel containing therein a level detecting means, said means communicating with and activating the aforesaid motor.

References Cited
UNITED STATES PATENTS

| | | | |
|---|---|---|---|
| 763,195 | 6/1904 | Merz | 74—522 X |
| 1,908,653 | 5/1933 | Andrews | 74—522 X |
| 2,381,346 | 8/1945 | Gregg | 251—234 |
| 2,779,563 | 1/1957 | Spence | 251—234 |
| 3,013,437 | 12/1961 | Harding | 74—96 |

WILLIAM F. O'DEA, *Primary Examiner.*

D. MATTHEWS, *Assistant Examiner.*